Patented Oct. 31, 1939

2,178,492

UNITED STATES PATENT OFFICE 2,178,492

FLUID MEASURING APPARATUS

Harry S. Powley and Joseph H. Matthews, Toronto, Ontario, Canada

Application January 20, 1939, Serial No. 251,942

9 Claims. (Cl. 121—68)

The invention relates generally to improvements in meters for measuring flow of liquids, and in particular concerns certain new and useful improvements in the measuring unit of such meters, as described in the present specification and shown in the accompanying drawing that forms part of the same.

The invention appertains primarily to the type of measuring unit or apparatus employed in fuel and like meters in which the measuring unit comprises a casing having inlet and outlet ports and containing a circular piston of a smaller diameter than the casing-bore confined to a gyratory motion in a circular path about a central axis. The piston has a medial web with a rim tangentially engaged with the said bore to furnish an outer displacement chamber. The web is engaged by ring members that form part of the guiding mechanism and at the same time provide with the piston an inner displacement chamber. The outer displacement chamber is divided by a fixed bridge plate extending radially between the casing-bore and the ring members and interfitted with a slot in the piston to cause the latter to revolve for measuring the fluid displaced. The piston operates a register as will be well understood in the art.

While this type of measuring unit performs satisfactorily, it has the shortcoming that fluid tends to by-pass the piston, which affects the accuracy of the meter. This loss in the measure is due to the fact that, in order to enable the piston to have the necessary angular freedom with respect of the fixed bridge plate, the slot in the piston must be made considerably wider than the width of the bridge plate. Hence this affords an opening for passage of fluid that goes unmeasured.

It is therefore the object of the present invention to produce a measuring unit in which the above mentioned by-passing of fluid is precluded.

It is a further object of the invention to provide a highly efficient and serviceable device of the class described that can be depended upon for accuracy in the measuring of various kinds of fluids.

A still further object is to provide a practical meter unit that is inexpensive to manufacture and possessed of a minimum of working parts.

Referring to the accompanying drawing, Figure 1 is a plan view of the fluid measuring apparatus.

Like numerals of reference denote like parts in each figure of the drawing.

Figure 1:
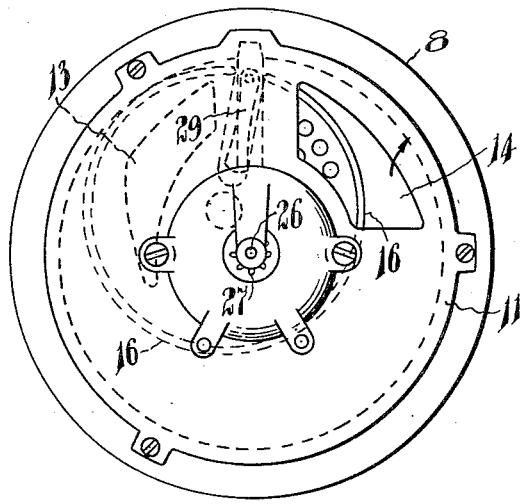
Figure 2:
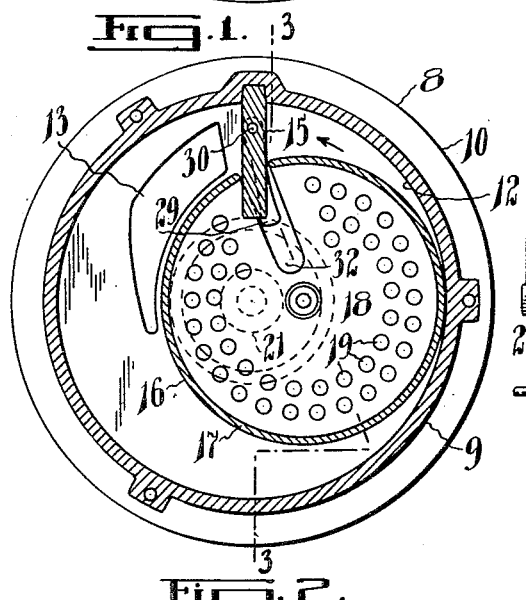
Figure 2 is a horizontal section thereof taken on line 2—2 of Figure 3.
Figures 3, 4:
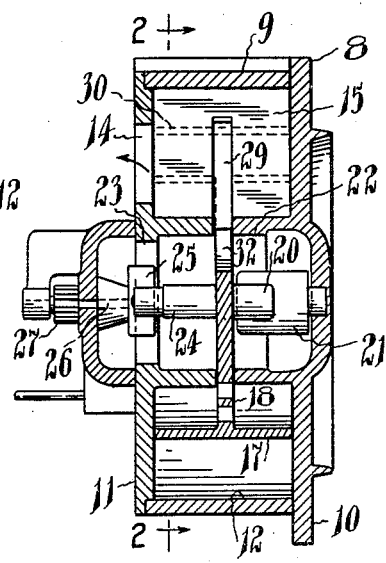
Figure 3 is a vertical section taken on line 3—3 of Figure 2.
Figure 4 is a perspective view of the piston and the bridge plate.
Figures 5, 6:
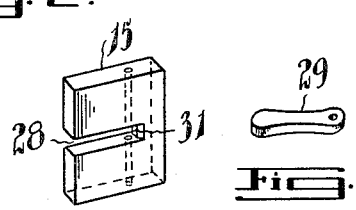
Figure 5 is a detail of the bridge plate.
Figure 6 is a detail of the oscillating finger thereof.

As illustrated in the drawing, the measuring unit to which the invention appertains comprises a casing generally denoted at 8 that is contained in the meter casting (not shown). The casing is composed of the cylinder 9 and the detachable bottom and top plates 10 and 11 respectively. The bore 12 of the cylinder is circular and is sealed by the said plates whose inner faces are parallel to each other.

The bottom plate is furnished with the inlet port 13 that communicates with the usual induction passage in the casting aforesaid whereby the liquid to be metered is introduced into the measuring chamber under gravity flow. The top plate is similarly provided with an outlet port 14 communicating with the eduction passage, which port is located at the opposite side of the fixed bridge plate 15 that extends radially of the casing-bore 12 between the opposing bottom and top plates.

The circular piston 16 is of a much less diameter than the casing-bore and tangentially contacts the same; said piston being composed of a rim 17 and a perforated web 18 disposed midway of the width thereof. The series of holes 19 furnish the perforation in the web and provide for passage of fluid from one side to the other of the hollow piston. The rim is a sliding fit between the inner faces of the aforesaid bottom and top plates, and the web 18 has a central round boss 20 that forms part of the mechanism for constraining the piston to its gyratory movement. The boss depends from the web and travels around a roller or like member 21 centrally carried by the bottom plate 10 and axially disposed in the bore of the casing.

The other part of the constraining mechanism comprises a ring member 22 rigid with the bottom plate and projecting inwardly therefrom with its end face engaged with the web of the piston. The bore of the ring member is of a diameter sufficient to accommodate the boss 20 and confine it to circular travel about the roller 21. The periphery of the ring member tangentially contacts the inner face of the rim at the lower side of the web, while a like ring member 23, projecting from the top plate 11, similarly contacts the inner face of the rim at the upper side of the web. Both the said ring members have sealing contact with the bridge plate with which the piston has a slotted connection. Such sealing contact is important in this type of measuring unit for the reason that the piston has a dual pumping action, one external between the rim and the bore of the casing, and the other between the ring members and the rim.

The gyrating of the piston operates the register of the meter as is well known in the art. To this end a known mechanism is shown as consisting of a stud 24 projecting centrally from the web 18 with a roller terminus located at one side of an arm 25 rigid with a shaft 26 disposed axially of the casing-bore and provided with a pinion 27 that meshes with the gearing of the register.

In carrying out the improved structure, the bridge plate 15 is provided with a slot 28 disposed medially of its breadth and of a width just sufficient to enable the piston-web 18 to slidably fit therein. This slot receives the web when the piston is off dead centre position and is sealed normally by a swingable finger 29. Said finger extends lengthwise of the slot and is a sliding fit therein, the outer end being pivoted by a pin 30 and rounded off on the radius of the pin axis so as to be constantly engaged with a curved face 31 that precludes leakage of fluid at this junction. The other or free end extends to and between the ring members 22 and 23.

The piston is supplied with a slot 32 extending radially inwardly of its circumference, but only of a width about equal to the width of the bridge plate. The opposing walls of the slot are parallel and receive the finger 29 whose sides are shown as curved inwardly to prevent binding in the slot in the extreme angular positions of the piston with respect of the blade plate. This slot functions to prevent the piston from turning about its axis in its gyratory movement, and also constrains the finger to a limited oscillatory motion within the confines of the bridge plate so as to effectively seal off opposite sides of the chamber of the casing in all phases of the travel of the piston. Accordingly the necessity of providing a laterally enlarged slot in the piston for clearance is dispensed with and the attendant escape of fluid is overcome.

It has been found in practice that this invention produces an exceedingly sensitive meter and one in which accuracy is maintained over a large range of flows.

What we claim is:

1. In a fluid meter, a casing having inlet and outlet ports and formed to provide a piston chamber having opposed parallel end faces and a cylindrical wall, a cylindrical piston tangentially disposed within said chamber and of a diameter substantially less than that of the chamber, said piston having a peripheral rim and a radial web extending to the rim whereby a fluid chamber is formed in the piston, said piston also having a radial slot and being perforated to provide inflow and outflow passages for its chamber, a ring member concentric with said wall of the chamber and extending into the chamber of the piston at a tangent to said rim, means between the casing and the piston whereby the piston is constrained to gyrate, a bridge plate fixedly located within the chamber of the casing and radially extending to the said ring member, said bridge plate being engaged with the slot of the piston and having a slot in the plane of the web thereof, and oscillatory means in the slot of the bridge plate such as to normally seal the same and yet permit unhampered gyratory movement of the piston.

2. A structure as defined in claim 1, in which the inflow and outflow passages in the piston are formed by a series of holes in the web thereof.

3. In a fluid meter, a casing having inlet and outlet ports and formed to provide a piston chamber having opposed parallel end faces and a cylindrical wall, a cylindrical piston tangentially disposed within said chamber and of a diameter substantially less than that of the chamber, said piston having a peripheral rim and a radial web disposed substantially medially thereof whereby opposite fluid chambers are formed in the piston, said piston also having an inwardly extending radial slot and being perforated to provide inflow and outflow passages for its chambers, a ring member extending inwardly from each end face of the casing and abutting the web of the piston, each ring member being concentrically disposed with respect of the casing chamber and tangentially engaged with the rim of the piston, means between the casing and the piston whereby the piston is constrained to gyrate, a bridge plate fixedly located within the chamber of the casing and radially extending to each of said ring members, said bridge plate being engaged with the slot of the piston plate being receptive to the web thereof, and having a slot receptive to the web thereof, and oscillatory means in the slot of the bridge plate extending into the slot of the piston and operating to provide a fluid seal for te interfitting connection between the bridge plate and the piston.

4. In a fluid meter, a casing having inlet and outlet ports and formed to provide a piston chamber having opposed parallel end faces and a cylindrical wall, a cylindrical piston tangentially disposed within said chamber and of a diameter substantially less than that of the chamber, said piston having a peripheral rim and a radial web disposed substantially medially thereof whereby opposite fluid chambers are formed in the piston, said piston also having an inwardly extending radial slot and being perforated to provide inflow and outflow passages for its chambers, a ring member extending inwardly from each end face of the casing and abutting the web of the piston, each ring member being concentrically disposed with respect of the casing chamber and tangentially engaged with the rim of the piston, means between the casing and the piston whereby the piston is constrained to gyrate, a bridge plate fixedly located within the chamber of the casing so as to separate the aforesaid inlet and outlet ports thereof, and radially extending to each of said ring members, said bridge plate being engaged with the slot of the piston and having a lengthwise slot of a width to form a slide fit with the web of the piston to which it is receptive when the piston is displaced from dead centre, and a member swingably confined in the slot of the bridge plate and engaged in the slot of the piston so as to provide a fluid seal for the interfitting conection.

5. In a fluid meter, a casing having inlet and outlet ports and formed to provide a piston chamber having opposed parallel end faces and a cylindrical wall, a cylindrical piston tangentially disposed within said chamber and of a diameter substantially less than that of the chamber, said piston having a peripheral rim and a radial web disposed substantially medially thereof whereby opposite fluid chambers are formed in the piston, said piston also having an inwardly extending radial slot and being perforated to provide inflow and outflow passages for its chambers, a ring member extending inwardly from each end face of the casing and abutting the web of the piston, each ring member being concentrically disposed with respect of the casing chamber and tangentially engaged with the rim of the piston, means between the casing and the piston whereby the piston is constrained to gyrate, a bridge plate fixedly located within the chamber of the casing and radially extending to each of said ring members, said bridge plate being engaged in the slot of the piston and having a slot receptive to the web thereof, and a finger lengthwise arranged in the slot of the bridge plate and of a width to seal the same, said finger having a pivotal axis to enable it to swing in the bridge plate and having an interfitting connection with the slot of the piston.

6. A structure in accordance with claim 5, in which the axis of the finger consists of a pin lodged in the outer end thereof and in the bridge plate, and in which the outer end of the finger has a curved face in contact with the adjacent end of the slot of the bridge plate such as to provide a sealing juncture.

7. In a meter, the combination with a measuring unit comprising a casing having a circular bore with a pair of opposing central ring members terminating short of each other and defining a fluid chamber, a fixed bridge plate radially interrupting the chamber intermediate of inlet and outlet passages formed in the casing, a piston of a smaller diameter than said bore and constrained to a gyratory motion in the chamber, the piston being engaged with the bridge plate by means of a slot; of a finger lodged in a slot in the bridge plate and extending lengthwise thereof with its outer end pivoted thereto and its inner end engaged in the slot of the piston, the finger being a sliding fit in the slot of the bridge plate, which slot being in the plane of the web of the piston and being a slide fit for the web.

8. In combination in a measuring apparatus for a meter, a casing having a cylindrical wall and opposing parallel walls and having inlet and outlet ports, opposing ring members extending inwardly from said opposing walls and concentrically disposed with respect to said cylindrical wall, a perforated piston of a smaller diameter than said cylindrical wall and constrained to gyrate within the casing, said piston having a rim and a web, the web being disposed substantially medially of the rim and slidably operating between said ring members, the piston also having a radial slot with parallel sides extending into the web portion, a bridge plate fixed in the casing between the aforesaid parallel walls and extending from the cylindrical wall to the said ring members, said bridge plate having a slot in the plane of the web of the piston and receptive thereto, the bridge plate being normally engaged with the slot of the piston, a finger extending lengthwise in the slot of the bridge plate to and between the ring members, the finger being a slide fit in its slot and a free fit in the slot of the piston, and means pivoting the outer end of the finger, the structure being such as to enable the piston to have unhampered movement but preventing the escape of unmeasured fluid.

9. A structure as defined in claim 8, and in which the sides of the finger are curved inwardly such as to prevent binding in the slot of the piston in the extreme angular positions of the piston with respect of the bridge plate.

HARRY S. POWLEY.
JOSEPH H. MATTHEWS.